(No Model.)
G. POPPLEWELL.
HEAD REST.
No. 280,078. Patented June 26, 1883.
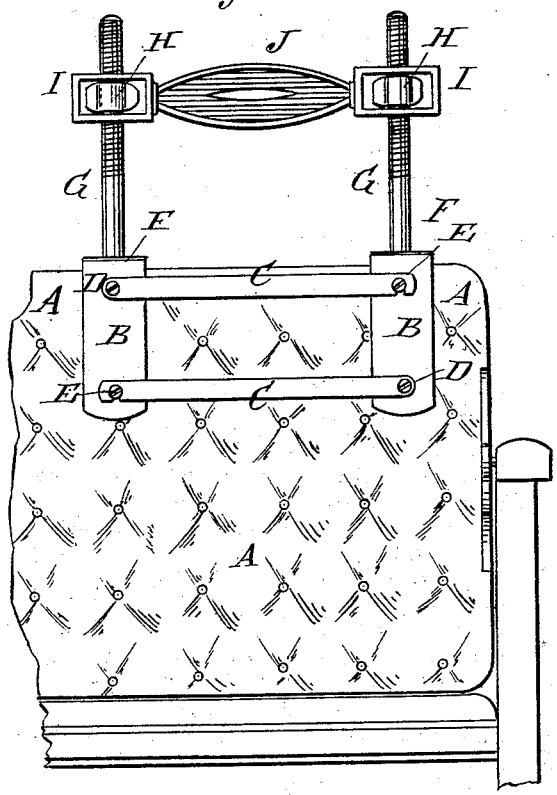
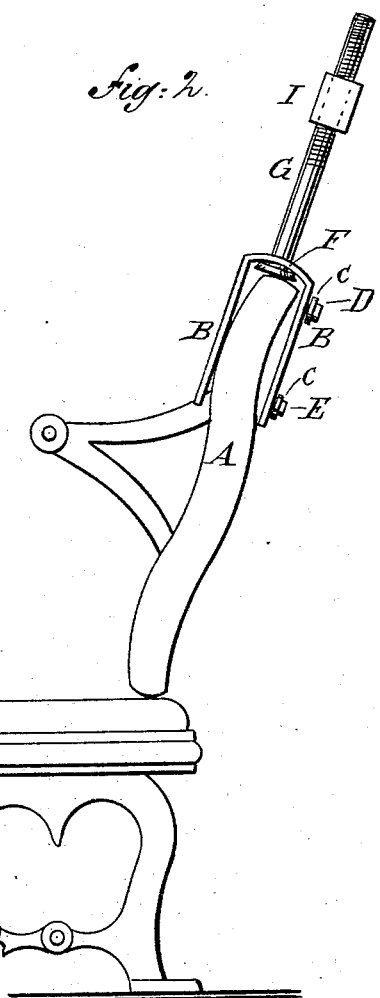
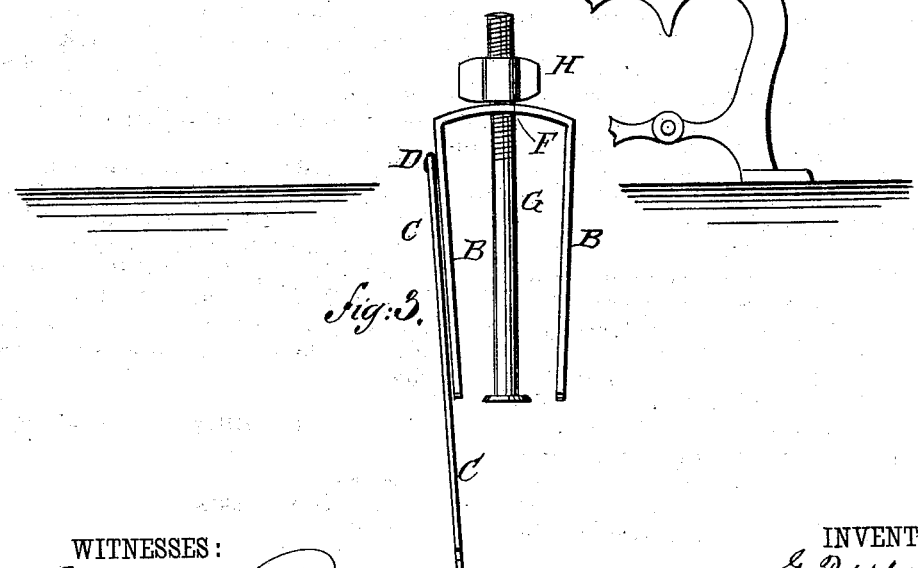
WITNESSES:
Chas. Nida
C. Sedgwick
INVENTOR:
G. Popplewell
BY Munn & Co.
ATTORNEYS.

UNITED STATES PATENT OFFICE.

GEORGE POPPLEWELL, OF BRISTOL, PENNSYLVANIA.

HEAD-REST.

SPECIFICATION forming part of Letters Patent No. 280,078, dated June 26, 1883.

Application filed March 20, 1883. (No model.)

*To all whom it may concern:*

Be it known that I, GEORGE POPPLEWELL, of Bristol, in the county of Bucks and State of Pennsylvania, have invented a new and Improved Head-Rest, of which the following is a full, clear, and exact description.

Reference is to be had to the accompanying drawings, forming a part of this specification, in which similar letters of reference indicate corresponding parts in all the figures.

Figure 1 is a rear elevation of my improvement, shown as applied to the back of a railroad-car seat. Fig. 2 is a side elevation of the same. Fig. 3 is a side elevation of the head-rest shown folded.

The object of this invention is to promote the comfort of those traveling in railroad-cars.

A represents the back of an ordinary railroad-chair. B are two V-shaped bars, the bends of which are made of such a size as to readily receive the edge of a railroad-chair back, and which are connected when applied to a chair by bars C. The bars C are each hinged at one end to one of the bars B by screws or rivets D, and have recesses formed in the lower edges of their other ends to hook upon screws E, attached to the other bar B.

In the bends of the bars B are formed holes F, through which are passed rods G. The rods G have heads upon their lower ends and screw-threads upon their upper ends, upon which are placed nuts H. The nuts H are placed within keepers I, which have holes formed through them for the passage of the rods G.

To the keepers I are attached the ends of a pad, J, of leather, cloth, or other suitable material, for the head to rest upon, and which can be adjusted to the proper elevation by turning the nuts H up and down. When not required for use the pad J and its keepers I are detached, the bars C are unhooked, the bars B are removed from the chair-back and placed close together, and the rods G are allowed to drop down, so that the nuts H will rest upon the bends of the said bars B, so that the head-rest can be packed into small space for convenient carriage.

With this construction a traveler can readily attach the head-rest to the back of a railroad-chair and adjust the pad at such a height as to support his head in a comfortable position, so that the fatigue of traveling will be greatly alleviated.

Having thus described my invention, I claim as new and desire to secure by Letters Patent—

A head-rest formed of the pad J, having end-keepers, I I, the nuts H H, the headed screws G G, and the V-shaped bars B B, having holes F F, screws D E, and hook-bars C C, whereby the various parts may be packed together or brought into their relative position for use, as described.

GEORGE POPPLEWELL.

Witnesses:
JOHN SANDERSON,
A. S. RAY.